United States Patent [19]

Aikens et al.

[11] 4,254,931
[45] Mar. 10, 1981

[54] REAR VIEW MIRROR MOUNT FOR INTERIOR OF AUTOMOBILE

[75] Inventors: William R. Aikens, Birmingham; Arthur W. Kurz, Southfield, both of Mich.

[73] Assignee: Standard Mirror Company, Inc., Troy, Mich.

[21] Appl. No.: 51,679

[22] Filed: Jun. 25, 1979

[51] Int. Cl.³ .................. F16M 13/00; A47G 1/24
[52] U.S. Cl. .......................... 248/549; 248/222.1; 248/475 B; 248/483
[58] Field of Search ............. 248/549, 475 B, 478, 248/480, 483, 487, 476, 481, 223.4, 222.1, 225.1, 223.1

[56] References Cited

U.S. PATENT DOCUMENTS

| | | | |
|---|---|---|---|
| 2,129,189 | 9/1938 | Alder | 248/478 |
| 3,237,898 | 3/1966 | Goss | 248/478 |
| 3,367,616 | 2/1968 | Bausch et al. | 248/483 |
| 3,436,049 | 4/1969 | Claire et al. | 248/479 |
| 3,589,662 | 6/1971 | Lagrange | 248/549 |
| 3,631,572 | 1/1972 | Lange | 248/223.4 X |
| 3,703,270 | 11/1972 | Derrick | 248/549 |
| 4,071,217 | 1/1978 | Kongelka | 248/549 X |
| 4,105,296 | 8/1978 | Tomlin | 248/478 X |

FOREIGN PATENT DOCUMENTS

| | | | |
|---|---|---|---|
| 25898 | 5/1956 | Fed. Rep. of Germany | 248/549 |
| 2153875 | 5/1973 | Fed. Rep. of Germany | 248/479 |
| 2354551 | 5/1975 | Fed. Rep. of Germany | 248/549 |
| 2535940 | 4/1976 | Fed. Rep. of Germany | 248/475 B |
| 1084850 | 9/1967 | United Kingdom | 248/549 |
| 1196266 | 6/1970 | United Kingdom | 248/549 |

*Primary Examiner*—J. Franklin Foss
*Attorney, Agent, or Firm*—Harness, Dickey & Pierce

[57] ABSTRACT

A rear view mirror for mounting on the interior surface of an automobile windshield so constructed and arranged that in the event of its being struck by the head of an occupant due to a sudden stop or collision the mirror mount will automatically snap loose and drop out of the way without causing serious injury to the occupant. Further, the construction is such that the mirror cannot easily be slipped off its mount by a pilferer.

4 Claims, 13 Drawing Figures

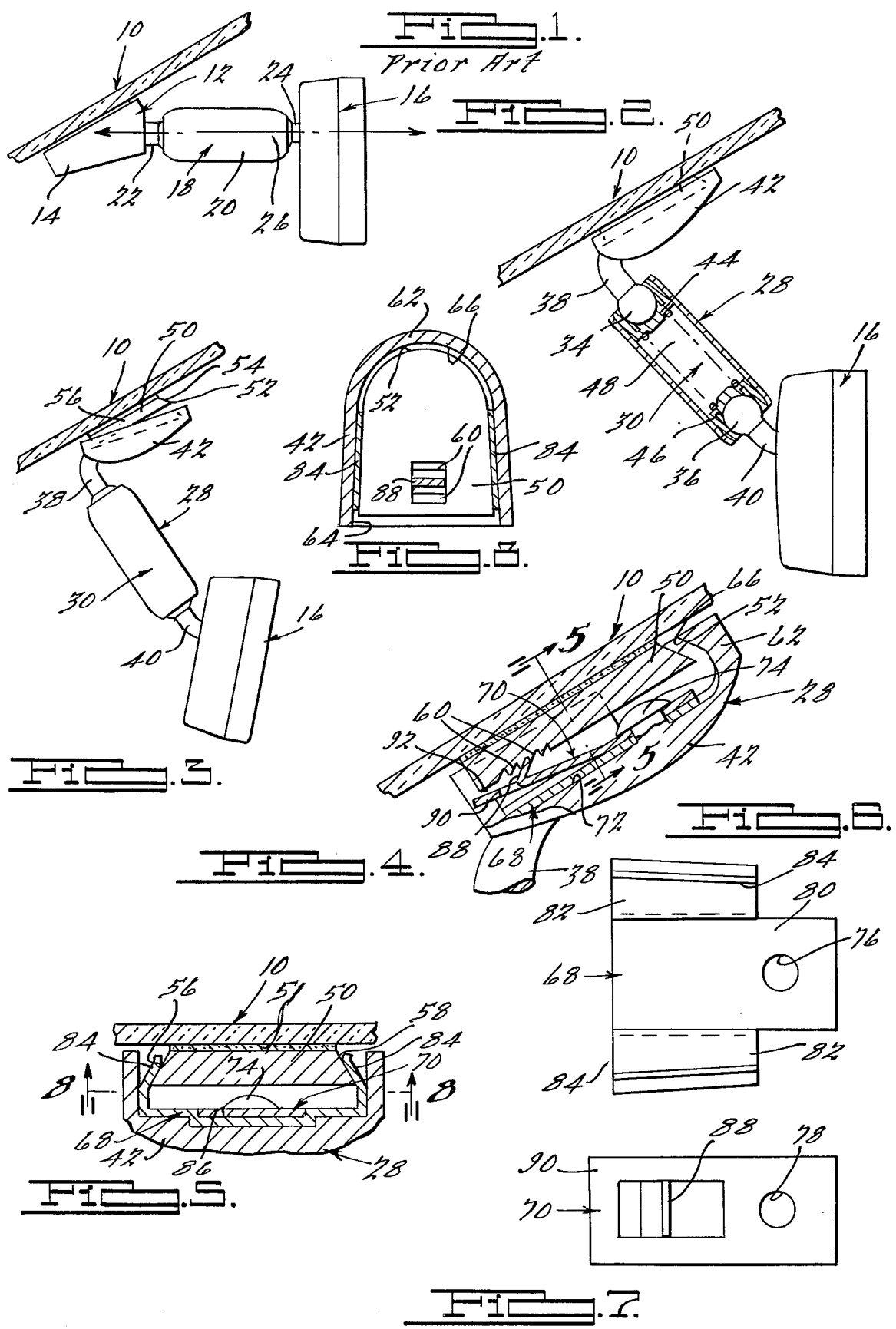

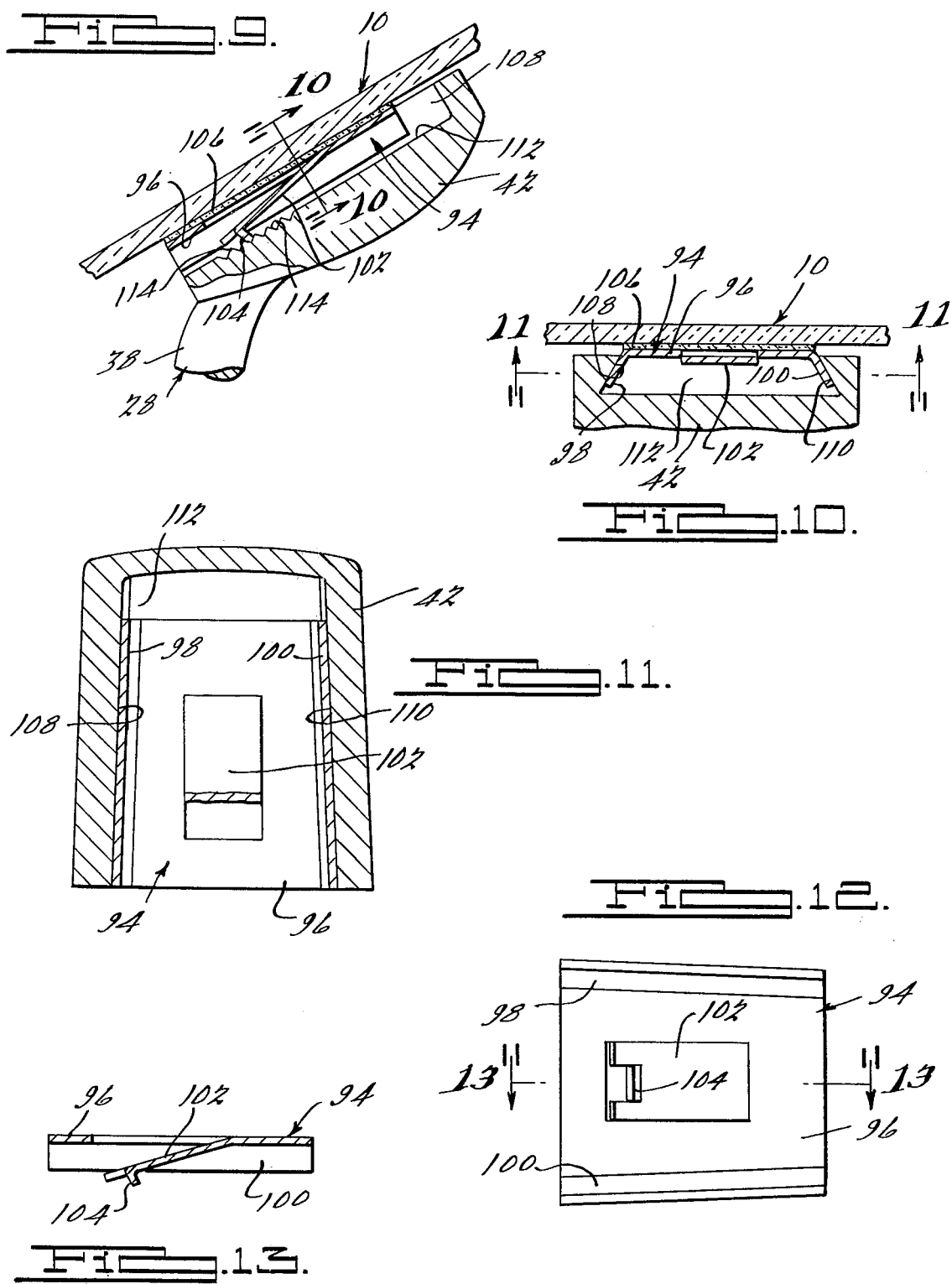

REAR VIEW MIRROR MOUNT FOR INTERIOR OF AUTOMOBILE

BACKGROUND OF THE INVENTION

Rear view interior mirrors mounted on the vehicle windshield in position in front of the driver usually a little to the right of the driver in left hand drives, are standard equipment in automotive vehicles. Such mirrors are in the line of the heads of occupants of the front seat, both driver and right hand passenger, should both occupants be thrown forward due to a sudden stop, either intentional by a quick and strong application of the brake or due to a collision.

Present mountings involve mounting the mirror through a bracket on a button secured to the windshield by an interconnection consisting of a double ball joint so that the mirror may be adjusted to different position. A serious difficulty arises due to the fact that in one position of adjustment a straight line interconnection results so that if struck by an occupant serious injury can result since the mirror does not pivot out of the way.

SUMMARY OF THE INVENTION

According to this invention the rear view mirror is mounted on the inner face of the windshield and interconnected thereto so that if hit by an occupant by a force in excess of approximately 50 to 100 pounds the mirror and the connected will be snapped out of the windshield mount and fall out of the way without serious injury to the occupant. Also, the mirror mounting bracket is connected by a ratchet and spring so that a tool is required to otherwise remove the mirror and mount from the windshield so that they cannot be readily pilfered.

These beneficial results are accomplished without sacrificing any of the selected adjusted positions of the mirror as in the prior conventional mounts.

BRIEF DESCRIPTION OF THE INVENTION

FIG. 1 is a side elevational view of a conventional rear view mirror mount as now used in automotive vehicles.

FIG. 2 is a side elevational view of a rear view mirror mount according to the present invention showing the mount attached to the inside surface of the windshield.

FIG. 3 is a view similar to FIG. 2 and showing the mirror and mount snapped from the windshield mounting button.

FIG. 4 is an enlarged longitudinal cross sectional view illustrating the details of the snap off mount of the bracket on the windshield button.

FIG. 5 is a cross sectional view taken substantially along the line 5—5 of FIG. 4.

FIG. 6 is a plan view of the clamp spring employed in the mount.

FIG. 7 is a plan view of the lock spring employed in the mount.

FIG. 8 is a cross-sectional view taken substantially along the line 8—8 of FIG. 5.

FIG. 9 is a view similar to FIG. 4 of a modified form of the present invention in which the position of the clamp spring is reversed and positioned directly on the windshield.

FIG. 10 is a cross-sectional view taken substantially along the line 10—10 of FIG. 9.

FIG. 11 is a cross-sectional view taken substantially along the line 11—11 of FIG. 10.

FIG. 12 is a plan view of the clamp spring.

FIG. 13 is a cross-sectional view taken substantially along the line 13—13 of FIG. 12.

DESCRIPTION OF THE PREFERRED EMBODIMENTS OF THE PRESENT INVENTION

For background, the conventional prior art rear view mirror construction now employed on many of the present day automotive vehicles is shown in FIG. 1. The automotive windshield is indicated at 10, at the usual slant to the horizontal, with the conventional rear view mirror assembly generally indicated at 12 mounted on the inner surface thereof usually in about the transverse center of the windshield and forwardly of the occupants of the front seat.

The prior conventional mirror assembly 12 includes a mounting member 14 connected to a rear view mirror 16 by a linkage 18. The linkage 18 includes a casing 20 having double ball joints mounted therein. Integral straight rods 22 and 24 of the ball joints project from opposite ends of the casing 20, rod 24 being rigidly connected to the rear face of the mirror 16. Rod 22 is rigidly connected to the top of mounting member 14. Thus, the double ball joints provide a universal connection between the mirror and the windshield so that the driver may adjust it for his best rear view vision.

As a practical matter, and unfortunately, drivers have often positioned the mirror just as illustrated in FIG. 1. Referring to this figure, the broken straight line 26 with arrows at the ends illustrates such a position and illustrates that a force against the mirror, caused for example, by being hit by the head of one of the car's occupants, is transmitted directly along this straight line and against the windshield, resulting in severe injuries. In other words, due to the straight alignment of the mirror assembly parts the universal interconnection cannot function in the instant required to move the mirror out of the line of impact of the occupant. The present invention contributes significantly to the solution of this problem with consequently material reduction in injuries as well as the severity of any injury that may result.

Referring to FIGS. 2 through 8, the preferred embodiment of the present invention is illustrated as comprising a rear view mirror assembly generally indicated at 28. The mirror assembly serves to mount the mirror 16 to the inner face of the windshield 10 through a linkage 30 which comprises a casing 32, similar to casing 20. Double ball joints are disposed within the casing 32 and such ball joints include ball heads 34 and 36 having integral curved projecting arms 38 and 40, respectively. The curved arm 40 is connected to the rear face of the mirror 16 and the curved arm 38 is connected adjacant the underedge to the snap release mounting member 42.

The balls 34 and 36 are mounted within ball seats 44 and 46, respectively. Such ball seats together with their respective balls are urged toward the ends of the casing by means of an intermediate spring 48 which resiliently positions the balls within the casing and permits universal adjustment of the mirror as well as resilient means to hold the mirror in its adjusted position.

The mounting member 42 is removably mounted on a button-like member 50 which is permanently adhered to the inner face of the windshield by means of a suitable adhesive 51 such as PVB which is a well known adhesive on the market.

The button 50 has a curved or semi-circular top edge 52 with the end edge thereof tapered inwardly as indicated at 54 (FIG. 3). The sides 56 and 58 of the button 50 are also tapered inwardly therealong as shown in FIG. 5. A plurality of serrations 60 are formed transversely of the button 50 on the inner face thereof and adjacent the lower edge, for a purpose to be hereinafter described.

The removable mounting member 42 has the top end 62 curved to conform to the top edge 52 of the button 50 and has tapered sides terminating in an open end 64. The inner surface 66 of the top 62 is tapered to conform to, but spaced from the taper 52 of the button 50 to provide a gap therebetween so that the mounting may snap free of the button.

A flat snap spring 68 and a flat lock spring 70 are fixed to the inside face 72 of the mounting member 42, for example, by a projection 74 disposed through aligned openings 76 and 78 in the spring 68 and 70, respectively. The projection is then spun over to provide a rivet-like connection. Spring 68 is disposed against the face of the member 42 and the spring 70 superimposed thereon.

The purpose of the spring 68 is to provide a snap action interconnection between the mounting member 48 and the button 50, and consequently provide a snap action interconnection between the entire mirror mount 28 and the windshield. Such spring 68 is generally in the form of a flat spring which includes a longitudinally central section 80 with transverse projections 82 at each side thereof which terminate in longitudinally extending and inwardly directed resilient sides 84.

To assemble the mounting member 42 to the button 50 and consequently mount the rear view mirror on the windshield, the open end 64 of the mounting member 42 is disposed above the upper end 52 of the button 50 and slid therealong so that the resilient sides 84 of the spring 68 are engaged by the tapered sides 56 and 68 of the button 50 (FIG. 5) and the tapered end 66 of the top of the member 42 engages the taper 52 of the button (FIG. 4).

Thus, the rear view mirror mount 28 is resiliently connected to the button 50 and consequently to the windshield. Due to this resilient interconnection and to the interconnection of the curved arms 38 and 40 of the ball joints between the mirror and the windshield even in the event that the mounting elements could be positioned in a direct impact line, as in FIG. 1, should the mirror be struck by the head of one of the occupants, the mounting member 42 would be snapped from its mount on the windshield and instantly moved out of the way. The spring 68 is so designed as well as the interacting tapers 52, 54, 56, 58 and 66, respectively, so that an impact in the range of 70 to 80 pounds force will cause the assembly 28 to drop from its windshield mount. Within this range a secure mount is assured as well as one that would be disconnected on impact without serious injury to the car's occupant.

In order to forestall pilferage, the lock spring 70 is so connected and mounted to prevent easy sliding of the member 42 off the button 50. The spring 70 extends longitudinally of the spring 68 and is mounted in a central well 86 (FIG. 5). The spring 70 is bent outwardly at its end (FIG. 4) and is formed with an inwardly and rearwardly directed lock finger 88 which is adapted to snap into one of the serrations 60 within the mounting member 42 which is slid longitudinally of the button 50 into its proper assembled position. The end of the spring 70 projects toward the end 90 of the spring 70, which projects toward the opening 64 of the mounting member 42 and is spaced slightly away from the adjacent face of the button 50 as indicated at 92 (FIG. 4). When the parts are properly assembled as shown in FIG. 4, the projection 88 is in one of the serrations 60 and the only way that the member 42 can be removed (except by the snap spring action above described) is by slipping an instrument, such as a screwdriver, into the space 92 to separate the finger 88 from the serration 60 and therefore separate the spring 70 from the button 50 to permit slipping the mounting member 42 up and over the top of the button.

Referring to FIGS. 9 through 13, a modified embodiment of the invention is illustrated. Like numerals are used to designate like parts in the views throughout. In this embodiment the mounting button 50 of the previous embodiment is replaced with a snap release spring 94 which serves the dual functions of the springs 68 and 70, above described.

The snap spring 94 is generally flat and formed of spring steel, with a transversely flat central base portion 96 terminating in outwardly tapering and resilient side walls 98 and 100. A central spring arm 102 located between the sides 98 and 100 is bent outwardly and has a rearwardly directed lock finger 104 formed thereon. The arm 102 and the lock finger 104 serve the same function as the lock spring 70 above described.

The snap release spring 94 is secured to the window in the same way and position as the mounting button 50 by a suitable adhesive or mastic 106.

In this embodiment the mounting member 42 is modified by forming inner and facing walls 108 and 110 tapered inwardly and complementary in taper to the spring sides 98 and 100, respectively. The member 42 is positioned over the spring 94 by sliding the spring 94 through the bottom open end of the member 42 with the walls 108 and 110 in engagement with the spring sides 98 and 100. The movement of the mounting member 42 is limited by the closed top which is curved both longitudinally and transversely to reduce the size of the overlying cavity 112 of the member 42. Another way of limiting the downward movement or positioning of the member 42 would be to form the sides 98 and 100 of the spring 94 and the walls 108 and 110 of the member 42 with complementary longitudinal tapers, narrowing from the lower or open end of the member 42 toward the inner closed end.

To prevent pilfering, in this embodiment, the inner face of the cavity 112 of the member 42 is formed with transverse serrations 114 similar to the serration 60. When positioned properly the projection 104 will drop into the cooperating serration 114 to interlock the parts. As in the embodiment above described, the only way the member 42 can be removed (except for the snap action separation between the mounting member 42 and the spring 94) is by the use of a screw driver, or the like, as above described.

Thus, the rear view mirror 28 is resiliently connected to the spring mount 94 through the snap spring or resilient interconnection of the member 42 with the spring 94 through the complementary spring sides 98 and 100 with tapered walls 108 and 110. The release is the same as in the embodiment first described should the mirror be struck by the head of one of the occupants.

Formal changes may be made in the embodiments specifically illustrated without departing from the spirit and substance of the invention, the scope of which is set forth in the appended claims.

We claim:

1. The combination of an automotive vehicle windshield, a rear view mirror, and means mounting said mirror on the inside face of said windshield for adjustably positioning said mirror thereon and for accomplishing a snap-off of the mirror from the windshield when impacted;

said last named means comprising a first mounting member fixed to the inside face of the windshield, a second mounting member removably disposed on said first mounting member, one of said first and second members having outwardly tapering side walls, a resilient member mounted on the other of said first and second members having longitudinally extending resilient side walls tapered to interfit with and resiliently engage said outwardly tapering side walls on said one of said first and second members to provide a snap-off interconnection between said first and second members upon impact with said mirror, a transverse locking serration provided on the inner facing wall of one of said first and second members, a lock spring on the inner facing wall of the other of said first and second members having an off-set end resiliently engageable with said serration, and said second member having a closed top end and an open bottom end providing access to said off-set end to permit longitudinal relative movement between said first and second members.

2. The combination according to claim 1 in which said first member has outwardly tapering side walls, in which said resilient member is mounted on said second member, in which said locking serration is provided on the facing wall of said first member, and in which said lock spring is on the facing wall of said second member.

3. The combination according to claim 2 in which the outwardly tapering walls extend around the top of said first member and in which the top of said second member has a complementary taper over the top of said first member and spaced therefrom.

4. The combination according to claim 1 in which the first member is formed by the resilient member which has outwardly tapering resilient side walls in which said second member has inwardly tapering side walls tapered to interfit with and resiliently engage said tapering side walls on said first members, in which said locking serration is provided on the facing wall of said second member, and in which said lock spring is on the facing wall of said first member.

* * * * *